United States Patent [19]
Lee

[11] 3,855,451
[45] Dec. 17, 1974

[54] FOOD HEATING AND WARMING CABINET
[75] Inventor: Robert E. Lee, Huntington, Ind.
[73] Assignee: Lincoln Manufacturing Company, Inc., Fort Wayne, Ind.
[22] Filed: May 2, 1974
[21] Appl. No.: 466,270

[52] U.S. Cl............... 219/400, 34/219, 126/21 A, 219/370, 219/386, 219/430
[51] Int. Cl.................... A21b 1/22, F27d 11/02
[58] Field of Search .......... 219/362, 370, 386, 415, 219/417, 419, 400, 430, 439, 460; 34/219; 126/21 A; 426/524

[56] References Cited
UNITED STATES PATENTS

| | | | |
|---|---|---|---|
| 2,499,525 | 3/1950 | Person | 219/362 |
| 2,671,280 | 3/1954 | Grieve et al. | 219/400 X |
| 2,688,808 | 9/1954 | Ipsen | 34/219 |
| 2,906,620 | 9/1959 | Jung | 426/524 |
| 2,957,067 | 10/1960 | Scofield | 219/400 |
| 2,969,450 | 1/1961 | Bernstein | 219/400 X |
| 3,548,153 | 12/1970 | Kells | 219/400 |
| 3,632,980 | 1/1972 | Hornaday, Jr. et al. | 219/370 |
| 3,780,794 | 12/1973 | Staub | 219/400 X |

Primary Examiner—Volodymyr Y. Mayewsky
Attorney, Agent, or Firm—Albert L. Jeffers; Roger M. Rickert

[57] ABSTRACT

A cabinet in which food packages can be heated preparatory to serving and maintained at a substantially uniform desirable temperature during serving. The cabinet is especially adapted for use in institutions, such as schools and the like, and is particularly characterized in being so constructed and arranged as to permit easy cleaning and maintenance thereof.

12 Claims, 6 Drawing Figures

FOOD HEATING AND WARMING CABINET

The present invention relates to cabinets in which foodstuffs can be heated to a desired temperature and held at that temperature during serving.

Cabinets of the nature referred to are widely used in institutions, such as schools and the like, wherein pre-packaged foodstuffs are delivered to the institutions for being served therein at meal time. The foods are generally pre-packaged and frozen and, in order to be able to handle the foods economically and in quantity, it is necessary that the packets of food be brought to serving temperature quickly while being maintained at the desired temperature during the serving operation.

A problem has always existed in connection with bringing the foods up to temperature quickly enough and maintaining the foods uniformly heated because the cabinets are constructed to receive a relatively large number of packets of food and circulation of heated air through the cabinets has not always been sufficiently uniform to maintain the desired temperature throughout the cabinet.

Furthermore, cabinets formerly constructed sometimes presented problems in respect of maintaining the cabinet in the absolutely sanitary condition that is necessary for articles of this nature and has sometimes presented problems in servicing due to the difficulty of gaining access to the operative parts of the cabinet.

BRIEF SUMMARY OF THE INVENTION

According to the present invention, the problems referred to above have been solved by forming the cabinet with a well for receiving trays on which the food packets are supported with the interior of the cabinet divided into compartments by partitions preferably formed of expanded metal to permit ready air flow therethrough.

The trays referred to, of which there may be several in superimposed relation in each compartment, are carried on an elevator structure which maintains the uppermost tray having food packets thereon at about the level of the top of the cabinet. The elevator structure in each compartment as well as the partitions separating the well of the cabinet into compartments are readily removeable for sanitizing purposes and which, at the same time, exposes the entire interior of the well for cleaning.

The corners of the well are preferably rounded thereby enhancing the circulation of air in the cabinet and, at the same time, making it easy to clean in the corners of the cabinet.

Extending along the bottom of the well are elongated electric heaters which are spaced upwardly from the bottom wall of the well and intermediate the electric heaters are tunnels extending substantially the full length of the bottom wall of the well. At one end of the well, there is a blower having an intake connected to the well in about the center of an end wall of the well and discharging air horizontally along the bottom wall of the well from one end of the bottom wall.

This arangement directs the air longitudinally along the heating elements and, also, through the tunnels and, furthermore, causes at least some air to enter the well at the fan end thereof. The net result of the arrangement is that the heat tends to be distributed throughout the well while flowing through and between the foraminous trays or baskets on which the food packets are carried whereby the entire interior of the well can be brought to the desired temperature and maintained at that temperature for a prolonged period of time.

The electric heaters are adapted for being energized at a higher rate for effecting rapid heating of the well and, once the desired temperature is reached, usually about 160°, the energization of the electric heaters can be reduced and the said temperature will be maintained.

Inasmuch as the suction side of the fan is connected to the interior of the well, the air tends to circulate within the well and sufficient operating conditions are maintained. The efficient operating conditions are further enhanced by the provision of a deflector member extending transversely along the top edge of the well at the end opposite the fan which tends to deflect air rising along the pertaining wall backwardly toward the fan inlet. In this manner, a minimum amount of heat is lost to the outside atmosphere.

The end of the cabinet in which the circulating fan is mounted is provided with the removeable outer end wall and, when this wall is removed, access can be had directly to the fan and the drive motor therefor and, also, to the ends of the electric heating elements and to the electrical components controlling the energization of the fan motor an the heating elements. The heating elements are elongated hairpin shaped elements and have the open ends thereof accessible through the aforementioned access door so that they can easily be replaced if necessary.

With the foregoing in mind, a primary object of the present invention is the provision of a food heating and warming cabinet in which food can be heated quickly and maintained at the proper temperature during serving.

Another object is the provision of a cabinet of the nature referred to which is easy to maintain in a sanitary condition.

A further object is the provision of a cabinet of the nature referred to which is easy to service.

The foregoing objects of the present invention as well as other objects and advantages thereof will become apparent upon reference to the following detailed specification taken in conjunction with the accompanying drawings in which.

DETAILED DESCRIPTION OF THE INVENTION

Figure 2:
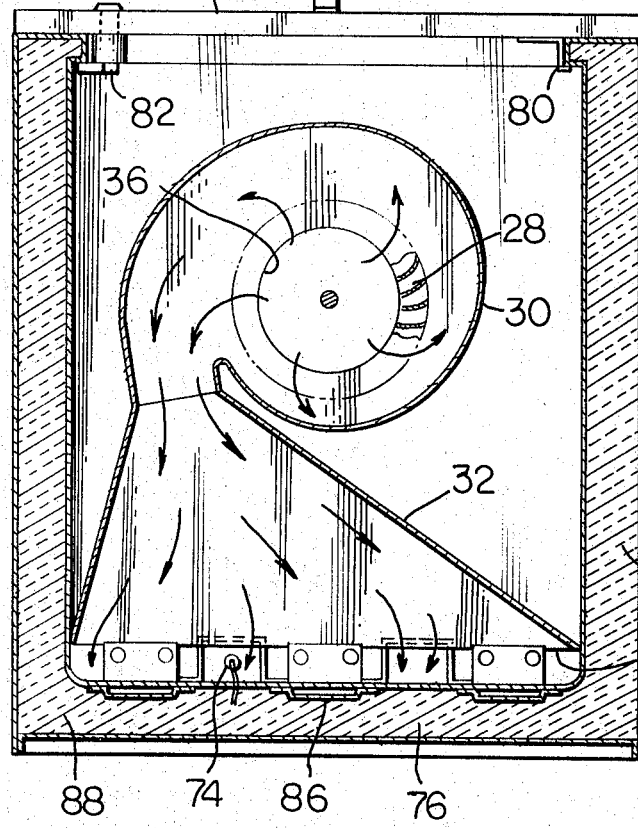
FIG. 2 is a transverse section indicated by line 2—2 on FIG. 1 showing the blower in one end of the frame of the cabinet.
Figure 4:
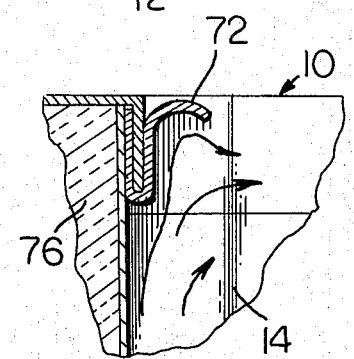
FIG. 4 is a fragmentary sectional view indicated by line 4—4 on FIG. 1 showing an air deflector member mounted within the well of the cabinet.
Figure 5:
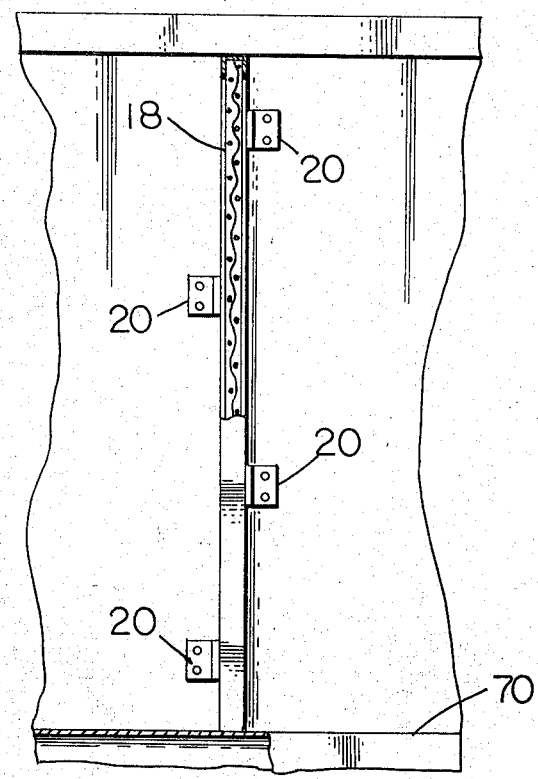
FIG. 5 is a vertical view looking edgeways at a partition member in the well of the cabinet showing the member in which it is supported.

Referring to the drawings more in detail, the cabinet comprises an outer frame 10 preferably supported on wheels 12 so that it can be moved about. The cabinet is formed with an upwardly opening well 14 therein adapted for being closed by lids 16 as shown in FIG. 2. The well is divided in the longitudinal direction by transverse partition members 18 which, as will be seen in FIG. 5, are receivable between angle clips 20 arranged on the side walls of the well.

The angle clip arrangement permits the partitions easily to be removed from the well for purposes of sanitizing the partitions and the well. The partitions are preferably formed of expanded metal and, advantageously, have a supporting rim about the outside thereof.

Each of the compartments into which the partitions divide the well is adapted for receiving an elevator member 22 on which baskets or trays of food packets can be placed. The food packets are generally prepared in a location remote from the warming cabinet and are conveyed thereto in frozen condition and the trays are stacked one on top of the other in each of the compartments with the elevator platform 22 moving downwardly in the respective compartment as trays are stacked thereon.

On each side of each compartment, hook members 24 are provided which engage the ends of springs connected to the platforms 22 so that the entire elevator structure in each compartment can readily be removed therefrom for purposes of cleaning the elevator structures and the interior of the well.

Figure 1:
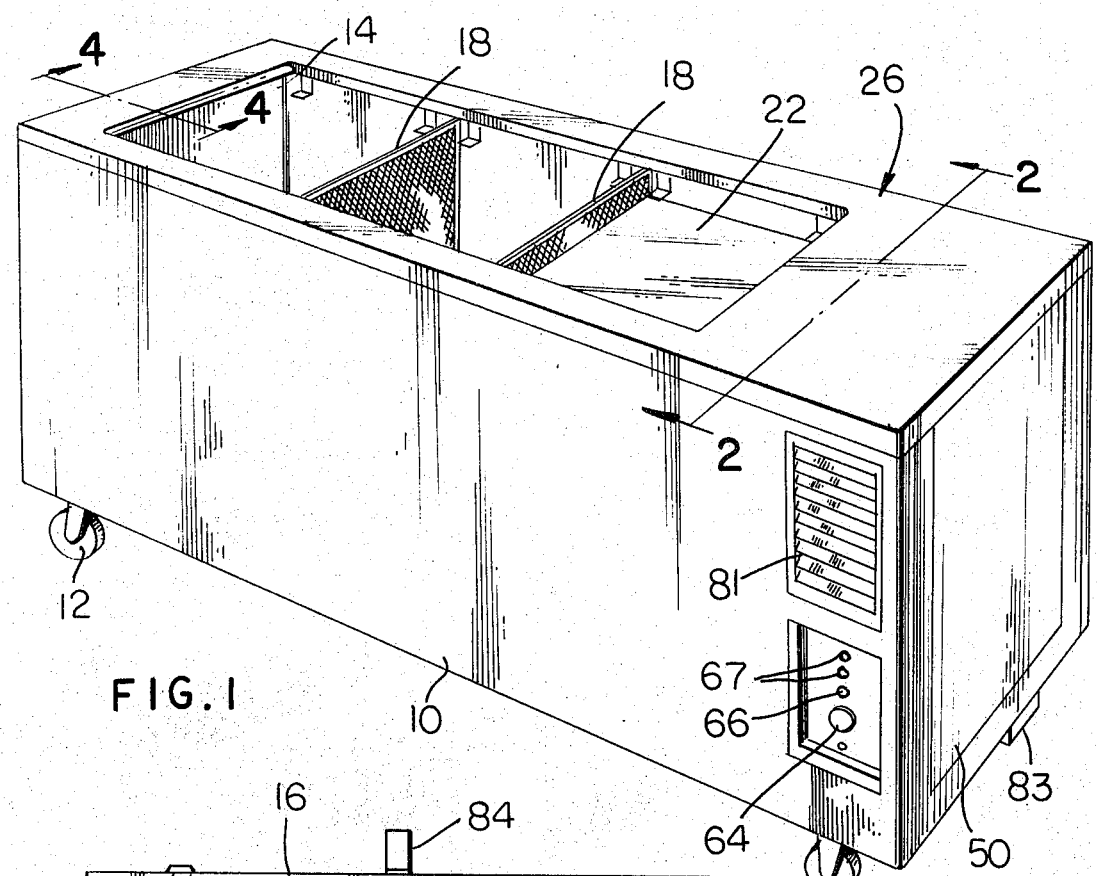
FIG. 1 is a perspective view showing a cabinet according to the present invention and with the lids thereof removed.

At the right end of the cabinet as it is viewed in FIG. 1 is a space generally indicated at 26 and within which are located the electrical components pertaining to the cabinet. As will be seen in FIG. 2, there is mounted within the compartment 26 a fan consisting of a rotor 28 and a scroll-like housing 30 with the outlet from the housing extending downwardly therefrom and flaring out in a fitting 32 which communicates below the edge of wall 34 with the adjacent end of the well 14 of the cabinet.

Figure 3:
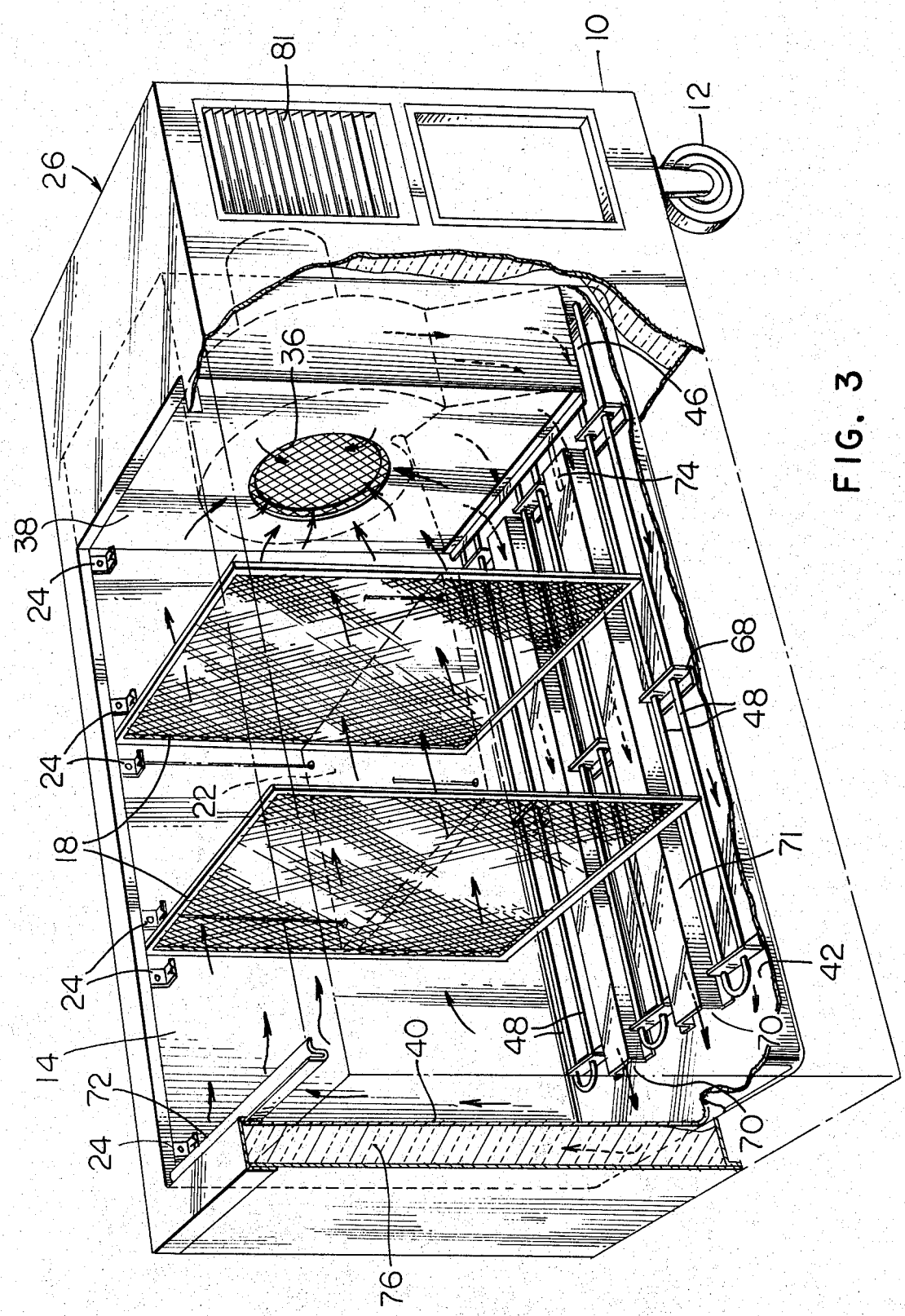
FIG. 3 is a perspective view partly broken away showing the location in the cabinet of the heating elements and the air flow through the cabinet.

As will be seen in FIG. 3, the inlet to the fan rotor is formed by an aperture 36 formed in the adjacent end wall of the well so that air is drawn into the rotor from the well of the cabinet and discharged in a substantially horizontal direction back into the cabinet at the bottom of the same said wall.

The well 14, in addition to end wall 38, in which the aperture 36 is located, has an opposite end wall 40 and a bottom wall 42 and opposite side walls, one of which is indicated at 44 in FIG. 3. The bottom wall 42 extends beneath the lower edge of end wall 38 to the side of the housing of the fan which is remote from wall 38 thereby defining a space 46 directly beneath the outlet of the fan.

The space 46 is traversed by a plurality of electric heater elements 48, each of which is hairpin-shaped with the closed end adjacent end wall 40 and with the other ends extending through the wall on which the fan housing is supported. In this respect, reference may be made to FIG. 6 which is a view looking in from the left side of FIG. 1 but with the access panel 50 removed therefrom.

Figure 6:
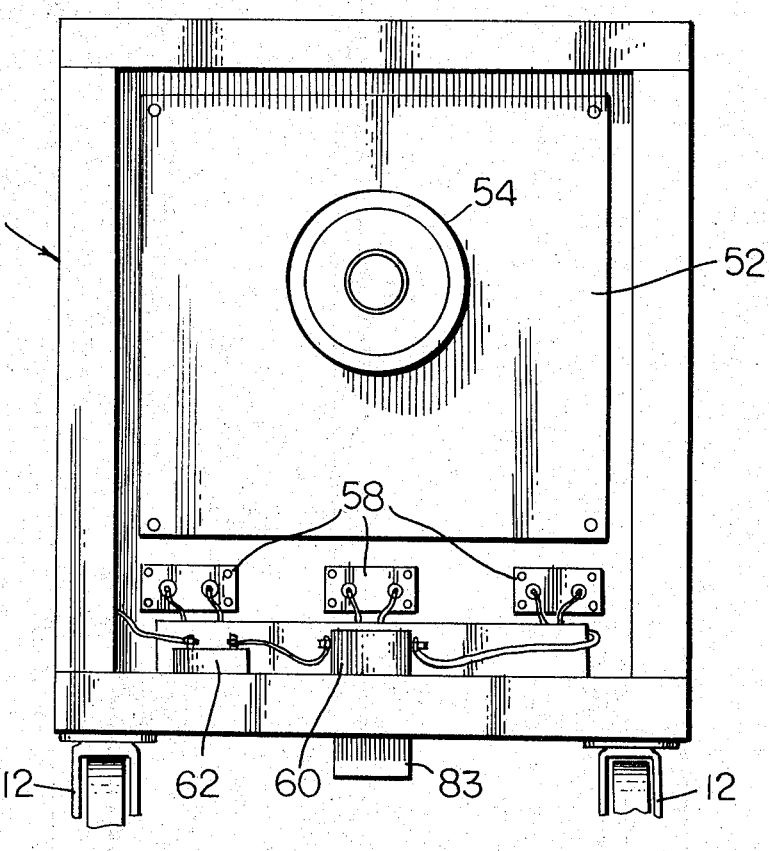
FIG. 6 is an end view of the cabinet with the access cover removed showing the location therein of the electrical components of the cabinet.

In FIG. 6, it will be noted that the fan structure comprises a support plate 52 on which fan motor 54 is mounted and that this support plate is attached to a vertical support plate 56 upstanding from the adjacent end of bottom wall 42 of the well.

Beneath the lower edge of plate 52, support members 58 are provided detachable from plate 56 and having secured thereto the adjacent ends of the electric heater elements 48. Connections are made from the heater elements to a terminal block 60 inside the cabinet and which, in turn, is connected to a contactor 62 and which contactor is under the control of control knob 64 on the front of the cabinet and the push button 66 adjacent the control knob 64. Indicator lamps 67 are also provided to indicate the state of operation of the device.

The heating elements are provided with support brackets 68 distributed therealong and secured to the bottom wall 42 of the well. Each heating element is removeable by releasing support brackets 68 from the bottom wall of the housing and withdrawing the heating element outwardly through the opening provided when access door 50 is removed, as by lifting the heating element upwardly out of well 14.

This makes for simple servicing of the unit, and it will be appreciated that the fan unit can also be serviced through the same access door opening and then all of the electrical auxiliaries are also available through this door.

As mentioned, the heating elements 48 are arranged in laterally spaced relation and between the heating elements and upstanding from the bottom wall 42 of the well are inverted U-shaped strips 71 which form tunnels 70 for conducting air from the fan end of the well to the opposite end. The provision of tunnels 70 provides for distribution of heated air completely through the cabinet and prevents the forming of overheated regions therein.

The circulation of air through the cabinet is also enhanced by the provision of a deflector element 72 at the top of the end wall 40 of the cabinet. Air rising along end wall 40 is deflected laterally by deflector 72 and returns toward fan inlet aperture 36 thus minimizing the loss to the outside of heated air from the cabinet.

The temperature within the cabinet is adjustable by adjusting control knob 64 and is also under the control of a temperature sensor 74 which, advantageously is positioned within one of the tunnels 70 formed by members 71 so that the temperature sensed thereby is more representative of the average temperature within the well than would be the case if the sensing element were to be exposed to radiant heat from one of the electric heaters.

The cabinet is, of course, insulated as by the provision of heat insulation in space 76 which completely surrounds the well of the cabinet.

The well of the cabinet is preferably formed of stainless steel throughout, including the partition members and the screen 78 which covers the fan inlet opening and the components of the elevator and the like. It is, thus, a simple matter to maintain the well of the cabinet and all parts therein in a sanitary condition. The outside of the cabinet may, also, consist of stainless steel or it may be formed of other materials if so desired.

It has been mentioned that the individual compartments are covered by lids, and one such lid is shown at 16 in FIG. 2 wherein it will be seen to have a hook 80 engaging under the frame of the cabinet at the rear while at the front a lock member 82 is provided which can be key actuated to release the lid from closed position. The lid is provided with a handle 84 for manipulating the lid.

The bottom wall of the well can be provided with support by means of longitudinally extending elements 86 which rest on transversely extending members 88 in the extreme bottom of the frame of the cabinet.

In operation, food packets are at about 38 degrees when inserted into the cabinet, and it is desired for them to be heated up to about 160°. The electric heaters are energized to bring the temperature up relatively rapidly and the supply of energy thereto is then cut down during serving.

The fan speed may, if desired, also be adjusted between high and low speeds between the time when the cabinet is coming up to temperature with the lids closed and when serving is taking place with at least one of the cabinet lids removed.

It has been found that the combination of radiation and convection provided by the distribution of the electric heaters and the provision of air tunnels in the bottom of the well make for uniform temperature conditions throughout the well of the cabinet.

In connection with the ease of cleaning the well when all of the elevator structures and the partitions have been removed therefrom, it will be noted that the walls of the well are joined by rounded corners and the well is preferably fabricated by welding to avoid all seams and the like which might make cleaning thereof difficult.

The tunnel members 70 preferably extend upwardly to a heighth at least slightly above the electric heaters thereby preventing the removeable partitions from engaging the heating elements and also maintaining space for air flow through the well.

It will also be noted that the side wall of the access compartment is provided with a louvered opening 81 for the supply of cooling air to the fan motor which drives the blower thereby preventing any contamination of the air in the well.

Power is supplied to the cabinet via a fitting 83 mounted on the bottom of the cabinet and to which an electric conduit or cable can be connected or which fitting can support a plug so that the cabinet can be plugged into a source of power.

Modifications may be made within the scope of the appended claims.

What is claimed is:

1. In an electrically heated insulated cabinet for heating packets of foodstuff preparatory to serving; a frame, an upwardly opening well formed in said frame having vertical side walls and end walls and a horizontal bottom wall, laterally extending perforated vertical partition means removeably mounted in said well and dividing the well into compartments, lid means for closing the well, a blower in said frame outside one end wall of said well having an inlet opening into said well through said one end wall for circulating the air within the well to heat the packets of foodstuff, outlet means for said blower at the bottom of said one end wall whereby said blower expels air horizontally over the bottom wall of the well toward the other end wall of the well, electric heaters extending longitudinally above said bottom wall in laterally spaced relation and within the range of the air discharged by said blower, and tunnel members mounted on said bottom wall between said heaters and extending longitudinally along said bottom wall and having open ends spaced inwardly from said end walls.

2. An electrically heated cabinet according to claim 1 in which said one end wall has a lower edge parallel to and spaced vertically from the bottom wall of said well and forming with said bottom wall a slit extending the width of said well and through which the blower discharge is directed.

3. An electrically heated cabinet according to claim 1 in which said electric heaters are spaced laterally in said wall in parallel spaced relation to the bottom wall of said well, said tunnel members comprising at least two tunnel members on said bottom wall upstanding therefrom to at least the level of said electric heaters.

4. An electrically heated cabinet according to claim 1 which includes an air deflector extending laterally in said well at the upper edge of said other end wall of the well and operable for deflecting air rising in the respective end of the well horizontally back toward the well.

5. An electrically heated cabinet according to claim 1 wherein said lid means includes lockable means for closing the tops of said compartments.

6. An electrically heated cabinet according to claim 1 which includes means providing for at least two levels of energization of said electric heaters whereby the well can be brought up to temperature rapidly and then held at said temperature.

7. An electrically heated cabinet according to claim 1 in which said blower is adapted for operation at a higher speed or at a lower speed.

8. An electrically heated cabinet according to claim 1 which includes resiliently supported elevator platform means removeably mounted in each compartment of said well on which trays of food packets can be supported in stacked relation.

9. An electrically heated cabinet according to claim 1 in which said well is formed of stainless steel with rounded corners.

10. An electrically heated cabinet according to claim 1 which includes an access door in said frame on the opposite side of said blower from said well, said access door forming a compartment in said frame in which the motor for the blower is mounted and which compartment contains the electrical components in circuit with said motor and said electric heaters and into which compartment the ends of the electric heaters extend.

11. An electrically heated cabinet according to claim 10 in which each heater is hairpin shaped with the closed end adjacent said other end wall of the well and with the ends to which electrical connections are made disposed in said compartment.

12. An electrically heated cabinet according to claim 10 in which said compartment has opening means therein for the supply of cooling air to the blower motor.

* * * * *

UNITED STATES PATENT OFFICE
CERTIFICATE OF CORRECTION

Patent No. 3,855,451          Dated Dec. 17, 1974

Inventor(s) Robert E. Lee

It is certified that error appears in the above-identified patent and that said Letters Patent are hereby corrected as shown below:

Col. 2, line 13 "sufficient" should be --- efficient ---

Col. 2, line 62 "member" should be --- manner ---

Col. 5, line 52 (Claim 1) "perforated vertical" should be --- vertical perforated ---.

Col. 2, line 27 "an" should be --- and ---

Signed and sealed this 18th day of March 1975.

(SEAL)
Attest:

RUTH C. MASON
Attesting Officer

C. MARSHALL DANN
Commissioner of Patents
and Trademarks